(12) United States Patent
Amin et al.

(10) Patent No.: US 10,068,180 B2
(45) Date of Patent: Sep. 4, 2018

(54) SYSTEMS AND METHODS FOR OPERATING A QUANTUM PROCESSOR TO DETERMINE ENERGY EIGENVALUES OF A HAMILTONIAN

(71) Applicant: D-Wave Systems Inc., Burnaby (CA)

(72) Inventors: Mohammad H. S. Amin, Burnaby (CA); Andrew J. Berkley, Vancouver (CA); Richard G. Harris, North Vancouver (CA); Trevor Michael Lanting, Vancouver (CA); Anatoly Yu Smirnov, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 253 days.

(21) Appl. No.: 14/896,259

(22) PCT Filed: Oct. 22, 2013

(86) PCT No.: PCT/US2013/066183
§ 371 (c)(1),
(2) Date: Dec. 4, 2015

(87) PCT Pub. No.: WO2014/197001
PCT Pub. Date: Dec. 11, 2014

(65) Prior Publication Data
US 2016/0132785 A1  May 12, 2016

Related U.S. Application Data

(60) Provisional application No. 61/832,645, filed on Jun. 7, 2013.

(51) Int. Cl.
*G06F 15/82* (2006.01)
*G06N 99/00* (2010.01)

(52) U.S. Cl.
CPC .......... *G06N 99/002* (2013.01); *G06F 15/82* (2013.01)

(58) Field of Classification Search
CPC .............................. G06N 99/002; G06F 15/82
See application file for complete search history.

(56) References Cited

U.S. PATENT DOCUMENTS

| | | |
|---|---|---|
| 7,135,701 B2 | 11/2006 | Amin et al. |
| 7,418,283 B2 | 8/2008 | Amin |
| 7,533,068 B2 | 5/2009 | Maassen van den Brink et al. |

(Continued)

FOREIGN PATENT DOCUMENTS

WO    2012/064974 A2    5/2012

OTHER PUBLICATIONS

Amin et al., "Macroscopic Resonant Tunneling in the Presence of Low Frequency Noise," arXiv:0712.0845v2, May 2008, 4 pages.

(Continued)

*Primary Examiner* — Fei Fei Yeung Lopez
(74) *Attorney, Agent, or Firm* — Seed IP Law Group LLP

(57) ABSTRACT

Systems and methods for employing macroscopic resonant tunneling operations in quantum processors are described. New modes of use for quantum processor architectures employ probe qubits to determine energy eigenvalues of a problem Hamiltonian through macroscopic resonant tunneling operations. A dedicated probe qubit design that may be added to quantum processor architectures is also described. The dedicated probe qubit enables improved performance of macroscopic resonant tunneling operations and, consequently, improved performance of the new modes of use described.

8 Claims, 7 Drawing Sheets

(56) References Cited

U.S. PATENT DOCUMENTS

| | | |
|---|---|---|
| 7,619,437 B2 | 11/2009 | Thom et al. |
| 7,639,035 B2 | 12/2009 | Berkley |
| 7,876,248 B2 | 1/2011 | Berkley et al. |
| 7,898,282 B2 | 3/2011 | Harris et al. |
| 8,008,942 B2 | 8/2011 | van den Brink et al. |
| 8,035,540 B2 | 10/2011 | Berkley et al. |
| 8,190,548 B2 | 5/2012 | Choi |
| 8,195,596 B2 | 6/2012 | Rose et al. |
| 8,283,943 B2 | 10/2012 | van den Brink et al. |
| 8,421,053 B2 | 4/2013 | Bunyk et al. |
| 2007/0239366 A1 | 10/2007 | Hilton et al. |
| 2009/0289638 A1 | 11/2009 | Farinelli et al. |
| 2012/0023053 A1 | 1/2012 | Harris et al. |
| 2012/0144159 A1 | 6/2012 | Pesetski et al. |
| 2013/0117200 A1 | 5/2013 | Thom |

OTHER PUBLICATIONS

Berkley et al., "Systems and Methods for Operating a Quantum Processor to Determine Energy Eigenvalues of a Hamiltonian," U.S. Appl. No. 61/832,645, 51 pages.

Berkley et al., "Tunneling spectroscopy using a probe qubit," arXiv:1210.6310v2, Jan. 2013, 5 pages.

Harris et al., "Probing Noise in Flux Qubits via Macroscopic Resonant Tunneling," arXiv:0712.0838v2, Feb. 2008, 4 pages.

International Search Report and Written Opinion dated Mar. 3, 2014, for corresponding International Application No. PCT/US2013/066183, 9 pages.

Lanting et al., "Cotunneling in pairs of coupled flux qubits," *Physical Review B* 82:060512, 2010, 4 pages.

Lanting et al., "Probing High Frequency Noise with Macroscopic Resonant Tunneling," arXiv:1103.1931v1, Mar. 2011, 5 pages.

Nielsen, "The Fermionic canonical commutation relations and the Jordan-Wigner transform," School of Physical Sciences, The University of Queensland, Jul. 29, 2005, 8 pages.

SYSTEMS AND METHODS FOR OPERATING A QUANTUM PROCESSOR TO DETERMINE ENERGY EIGENVALUES OF A HAMILTONIAN

BACKGROUND

Field

The present systems and methods generally relate to quantum processors.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems and devices, an "adiabatic" evolution is considered to be an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and δ is a coefficient much less than 1. Generally the initial Hamiltonian $H_i$ and the final Hamiltonian $H_f$ do not commute; that is, $[H_i, H_f] \neq 0$.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in, for example, U.S. Pat. Nos. 7,135,701 and 7,418,283.

Quantum Annealing

Quantum annealing is a computation method that may be used to find a low-energy state, typically preferably the ground state, of a system. Somewhat similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian (e.g., the Hamiltonian of an Ising spin glass) and therefore quantum annealing may be used to find the solution to such a hard problem. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E \propto A(t)H_D + B(t)H_P,$$

where A(t) and B(t) are time dependent envelope functions. For example, A(t) changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing A(t)). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of disordering Hamiltonian $H_D$ (i.e., reducing A(t)) in quantum annealing may follow a defined schedule known as an annealing schedule. Unlike adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem. The removal of the disordering Hamiltonian $H_D$ may occur after the same Hamiltonian has been added. That, is turn the disordering Hamiltonian $H_D$ on and then off.

Persistent Current

A superconducting flux qubit may comprise a loop of superconducting material (called a "qubit loop") that is interrupted by at least one Josephson junction. Since the qubit loop is superconducting, it effectively has no electrical resistance. Thus, electrical current traveling in the qubit loop may experience no dissipation. If an electrical current is coupled into the qubit loop by, for example, a magnetic flux signal, this current may continue to circulate around the qubit loop even when the signal source is removed. The current may persist indefinitely until it is interfered with in some way or until the qubit loop is no longer superconducting (due to, for example, heating the qubit loop above its critical temperature). For the purposes of this specification, the term "persistent current" is used to describe an electrical current circulating in the qubit loop of a superconducting qubit. The sign and magnitude of a persistent current may be influenced by a variety of factors, including but not limited to a flux signal $\Phi_X$ coupled directly into the qubit loop and a flux signal $\Phi_{CJJ}$ coupled into a compound Josephson junction that interrupts the qubit loop.

Quantum Processor

A quantum processor is any computer processor that is designed to leverage at least one quantum mechanical phenomenon (such as superposition, entanglement, tunneling, etc.) in the processing of quantum information. Many different designs for quantum processor hardware exist, including but not limited to: photonic quantum processors, superconducting quantum processors, nuclear magnetic resonance quantum processors, ion-trap quantum processors, topological quantum processors, quantum dot quantum processors, etc. Regardless of the specific hardware implementation, all quantum processors encode and manipulate quantum information in quantum mechanical objects or devices called quantum bits, or "qubits"; all quantum processors employ structures or devices for communicating information between qubits; and all quantum processors employ structures or devices for reading out a state of at least one qubit. The physical form of the qubits depends on the hardware employed in the quantum processors; e.g., photonic quantum processors employ photon-based qubits, superconducting quantum processors employ superconducting qubits, and so on.

A quantum processor may be designed to operate in a variety of different ways. For example, a quantum processor may be designed as a general-purpose processor or as a special-purpose processor, and/or may be designed to perform gate/circuit-based algorithms or adiabatic/annealing-based algorithms. Exemplary systems and methods for quantum processors are described in, for example: U.S. Pat. Nos. 7,135,701, 7,418,283, 7,533,068, 7,619,437, 7,639,035, 7,898,282, 8,008,942, 8,190,548, 8,195,596, 8,283,943, and US Patent Application Publication 2011-0022820, each of which is incorporated herein by reference in its entirety.

The architecture of a quantum processor may be motivated by a desire to perform a specific type of task or algorithm. For example, a quantum processor may be designed specifically to perform Shor's Algorithm to factor composite integers, or to perform quantum annealing to optimize an objective function, or to simulate a quantum system, etc. The architecture of a quantum processor can therefore limit the diversity of tasks that can be performed by the quantum processor. There is a need in the art to apply quantum processor architectures to implement new and/or alternative algorithms.

BRIEF SUMMARY

A method may be summarized as including programming a quantum processor including a plurality of superconducting flux qubits with a problem Hamiltonian, the problem Hamiltonian has at least one energy eigenvalue; initializing a probe qubit from the plurality of superconducting flux qubits; and scanning a transition rate of the probe qubit for a range of energy bias values of the probe qubit, the transition rate of the probe qubit may at least partially depend on a difference between an energy bias value of the probe qubit and an energy eigenvalue of the problem Hamiltonian such that the at least one energy eigenvalue of the problem Hamiltonian approximately corresponds to an energy bias value of the probe qubit to produce a locally maximal transition rate of the probe qubit. Programming the quantum processor may include initializing a set of computation qubits from the plurality of superconducting flux qubits in the quantum processor with a respective energy bias for each qubit in the set of computation qubits and a respective tunneling energy for each qubit in the set of computation qubits; and initializing communicative couplings between the computation qubits in the quantum processor with a respective coupling strength for each coupling device in the set of coupling devices. Initializing a probe qubit from the plurality of superconducting flux qubits may include programming a tunneling energy of the probe qubit, the tunneling energy of the probe qubit may be less than the respective tunneling energies of the computation qubits; and communicatively coupling the probe qubit to at least one computation qubit. The probe qubit may be a superconducting flux qubit from the plurality of superconducting flux qubits that is not included in the set of computation qubits. Furthermore, the method may include programming the at least one computation qubit to which the probe qubit is communicatively coupled with a compensation signal to compensate for the communicative coupling between the probe qubit and the at least one computation qubit. Communicative coupling between the probe qubit and the at least one computation qubit may be characterized by a coupling strength J, the method may further include: adding a compensation signal to the at least one computation qubit to which the probe qubit is communicatively coupled, the compensation signal may have a magnitude of at least approximately 2J and may be of opposite sign to the coupling strength. Scanning a transition rate of the probe qubit for a range of energy bias values of the probe qubit may include, for a plurality of energy bias values for the probe qubit ranging from a first value to a second value, iteratively: programming an energy bias of the probe qubit; annealing the probe qubit; and measuring the transition rate of the probe qubit. Annealing the probe qubit may include lowering the tunneling energy of the probe qubit. The method may further include: initializing at least one additional probe qubit from the plurality of superconducting flux qubits; and scanning a transition rate of the at least one additional probe qubit for a range of energy bias values of the at least one additional probe qubit, the transition rate of the at least one additional probe qubit may at least partially depend on a difference between an energy bias value of the at least one additional probe qubit and an energy eigenvalue of the problem Hamiltonian such that the at least one energy eigenvalue of the problem Hamiltonian approximately corresponds to an energy bias value of the at least one additional probe qubit to produce a locally maximal transition rate of the at least one additional probe qubit. Initializing the at least one additional probe qubit may include: programming a tunneling energy of the at least one additional probe qubit, the tunneling energy of the at least one additional probe qubit may be less than the respective tunneling energies of the computation qubits; and communicatively coupling the at least one additional probe qubit to at least one computation qubit. Scanning the transition rate of the at least one additional probe qubit may include, for a plurality of intermediate energy bias values for the at least one additional probe qubit ranging from a first energy bias value to a second energy bias value, iteratively: programming an energy bias of the at least one additional probe qubit; annealing the at least one additional probe qubit; and measuring the transition rate of the at least one additional probe qubit. Communicatively coupling the probe qubit to at least one computation qubit may include at least one of: galvanically coupling the probe qubit to at least one computation qubit or inductively coupling the probe qubit to at least one computation qubit. Communicatively coupling the probe qubit to at least one computation qubit may include programming a coupling device from the plurality of coupling devices that is not included in the set of computation coupling devices to provide communicative coupling between the probe qubit and a computation qubit. The problem Hamiltonian may represent the Hamiltonian of a quantum system, and programming the quantum processor with the problem Hamiltonian may include mapping the Hamiltonian of the quantum system to the quantum processor. The Hamiltonian of a quantum system may include a Hamiltonian of a molecular system, and mapping the Hamiltonian of the quantum system to the quantum processor by the programming subsystem may include mapping the Hamiltonian of the molecular system to the quantum processor by the programming subsystem. Mapping the Hamiltonian of the molecular system to the quantum processor by the programming subsystem may include using Jordan-Wigner transformations to map fermionic operators of the molecular system to spin operators of the quantum processor by the programming subsystem. The transition rate of the probe qubit may be at least partially dependent on a probability of the probe qubit transitioning from a first state to a second state, and measuring the transition rate of the probe qubit may include measuring a state of the probe qubit to determine whether or not a transition of the probe qubit state has occurred. Initializing a probe qubit from the plurality of superconducting flux qubits may include: programming a persistent current of the probe qubit, the persistent current of the probe qubit may be less than the respective persistent currents of the computation qubits; and communicatively coupling the probe qubit to at least one computation qubit. The probe qubit may be a superconducting flux qubit from the plurality of superconducting flux qubits that is not included in the set of computation qubits. Programming a persistent current of the probe qubit may include programming a critical current of the probe qubit.

A quantum processor may be summarized as including: a loop of superconducting material having a geometric inductance $L_{Gp}$; a compound Josephson junction that may interrupt the loop of superconducting material, the compound Josephson junction may include at least two Josephson junctions that are superconductingly electrically coupled in parallel with one another with respect to the loop of superconducting material; and a Josephson inductance $L_{Jp}$ for the loop of superconducting material, wherein a magnitude of the Josephson inductance $L_{Jp}$ is greater than a magnitude of the geometric inductance $L_{Gp}$. The quantum processor may further include: a number N of Josephson junctions that interrupt the loop of superconducting material, the N Josephson junctions being superconductingly electrically coupled in series with the compound Josephson junction and superconductingly electrically coupled in series with one another with respect to the loop of superconducting material, and wherein the N Josephson junctions positively contribute to the Josephson inductance $L_{Jp}$. N may be greater than or equal to 2. The quantum processor may further include: a plurality of superconducting flux qubits, wherein the plurality of superconducting flux qubits define a Hamiltonian; an inductive coupling device to couple the loop of superconducting material to at least one flux qubit from the plurality of superconducting flux qubits with coupling strength J; and a local bias system for applying a local bias with magnitude of about 2J and sign opposite to the coupling strength, to the at least one flux qubit from the plurality of superconducting flux qubits. The loop of superconducting material has a persistent current, the value of the persistent current may be less than the respective persistent currents of the at least one flux qubit from the plurality of superconducting flux qubits. The quantum processor may further include a programming interface in a programming subsystem to apply a magnetic field to the compound Josephson junction that interrupts the loop of superconducting material, wherein varying the magnetic field may adjust the persistent current in the loop of superconducting material.

A quantum processor may be summarized as including: a plurality of computation qubits, where each computation qubit is a superconducting flux qubit that may include, respectively: a loop of superconducting material having a length of at least $X_1$ and a geometric inductance of at least $L_{Gc}$; a compound Josephson junction that interrupts the loop of superconducting material; and a Josephson inductance of at most $L_{Jc}$, wherein a magnitude of the Josephson inductance $L_{Jc}$ is less than a magnitude of the geometric inductance $L_{Gc}$, at least one coupling device that provides tunable communicative coupling between a set of the computation qubits, wherein the at least one coupling device includes a loop of superconducting material interrupted by at least one Josephson junction; and a first probe qubit that may include: a loop of superconducting material having a length less than $X_1$ and a geometric inductance $L_{Gp}$; a compound Josephson junction that interrupts the loop of superconducting material of the first probe qubit, wherein the compound Josephson junction includes at least two Josephson junctions that are superconductingly electrically coupled in parallel with one another with respect to the loop of superconducting material of the first probe qubit; and a Josephson inductance $L_{Jp}$, wherein a magnitude of the Josephson inductance $L_{Jp}$ is greater than a magnitude of the geometric inductance $L_{Gp}$, the first probe qubit may be communicatively coupleable to at least one of the computation qubits. The quantum processor may further include: a second probe qubit that may include: a loop of superconducting material having a length less than $X_1$ and a geometric inductance of at most $L_{Gp}$; a compound Josephson junction that interrupts the loop of superconducting material of the second probe qubit, wherein the compound Josephson junction includes at least two Josephson junctions that are superconductingly electrically coupled in parallel with one another with respect to the loop of superconducting material of the second probe qubit; and a Josephson inductance of at least $L_{Jp}$, wherein a magnitude of the Josephson inductance may be greater than a magnitude of the geometric inductance, the second probe qubit may be communicatively coupleable to at least one of the computation qubits. The quantum processor may further include: a plurality of probe qubits, each probe qubit in the plurality of probe qubits may include, respectively: a loop of superconducting material having a length less than $X_1$ and a geometric inductance of at most $L_{Gp}$; a compound Josephson junction that interrupts the loop of superconducting material, the compound Josephson junction including at least two Josephson junctions that are superconductingly electrically coupled in parallel with one another with respect to the loop of superconducting material; and a Josephson inductance of at least $L_{Jp}$, where a magnitude of the Josephson inductance is greater than a magnitude of the geometric inductance, each probe qubit in the plurality of probe qubits is communicatively coupleable to at least one respective computation qubit in the plurality of computation qubits. The first probe qubit may further include a number N of Josephson junctions that interrupt the loop of superconducting material of the first probe qubit, the N Josephson junctions being superconductingly electrically coupled in series with the compound Josephson junction of the first probe qubit and superconductingly electrically coupled in series with one another with respect to the loop of superconducting material of the first probe qubit, and wherein the N Josephson junctions positively contribute to the Josephson inductance $L_{Jp}$ of the first probe qubit. N may be greater than or equal to 2. Each computation qubit may further include, respectively, a total inductance $L_{Tc}$ equal to a sum of the geometric inductance $L_{Gc}$ and the Josephson inductance $L_{Jc}$; the first probe qubit may further include a total inductance $L_{Tp}$ equal to a sum of the geometric inductance $L_{Gp}$ and the Josephson inductance $L_{Jp}$; and the total inductance of the first probe qubit $L_{Tp}$ may at least approximately equal to the total inductance of each computation qubit $L_{Tc}$. The first probe qubit may be directly communicatively coupleable to at least one of the computation qubits via at least one of galvanic coupling or inductive coupling. The quantum processor may further include: a coupling device that provides tunable communicative coupling between the first probe qubit and at least one of the computation qubits, the coupling device may include a loop of superconducting material interrupted by at least one Josephson junction, and the first probe qubit may be communicatively coupleable to at least one of the computation qubits via the coupling device. The first probe qubit may further include a first persistent current and each of the at least one computation qubits communicatively coupleable to the first probe qubit may further include a second persistent current and the first persistent current may be lower than the second persistent current.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
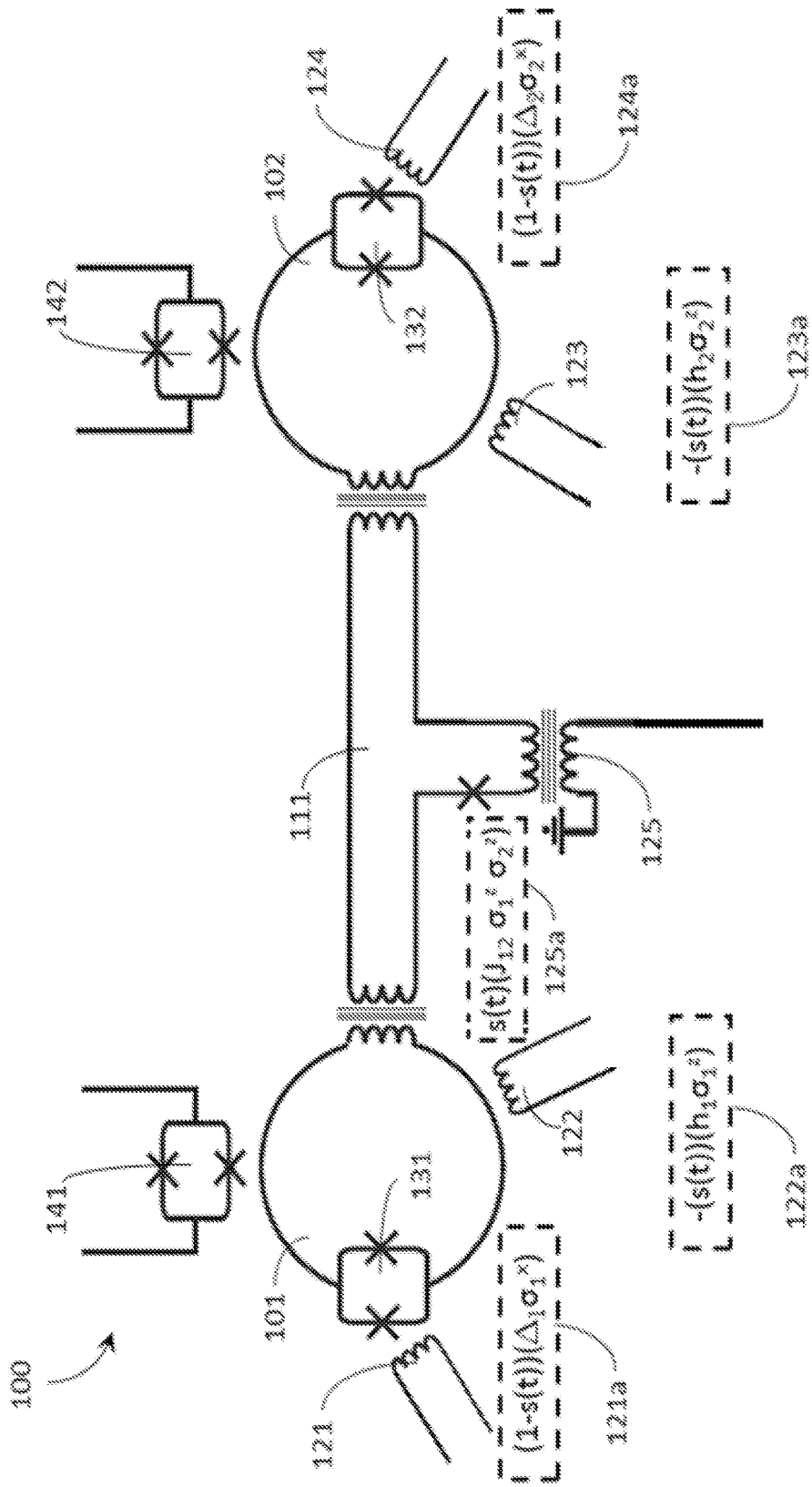
FIG. 1 is a schematic diagram of a portion of an exemplary superconducting quantum processor designed for adiabatic quantum computation (and/or quantum annealing) that may be used and/or adapted for use in accordance with the present systems and methods.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors, drive circuitry and non-transitory computer- or processor-readable media such as nonvolatile memory for instance read only memory (ROM), electronically eraseable programmable ROM (EEPROM) or FLASH memory, etc., or volatile memory for instance static or dynamic random access memory (ROM) have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors, including a grid or distributed network of multiple quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for operating a quantum processor. More specifically, the various embodiments described herein provide systems and methods for operating a quantum processor to perform new algorithms that determine energy eigenvalues of a problem Hamiltonian. The energy eigenvalues, and specifically the energy differences between them, may collectively be referred to as a spectrum. In some embodiments, the present systems and methods may be used to find the spectrum of a Hamiltonian. The Hamiltonian may be a problem Hamiltonian that may be solved by the quantum processor. Furthermore, the present systems and methods may be used to determine entanglement in a plurality of qubits. The present systems and methods also describe new structures that may be added to a quantum processor architecture to facilitate implementation of the algorithms described herein.

As an illustrative example, a superconducting quantum processor designed to perform adiabatic quantum computation and/or quantum annealing is used in the description that follows. However, as previously described, a person of skill in the art will appreciate that the present systems and methods may be applied to any form of quantum processor hardware (e.g., superconducting, photonic, ion-trap, quantum dot, topological, etc.) implementing any form of quantum algorithm(s) (e.g., adiabatic quantum computation, quantum annealing, gate/circuit-based quantum computing, etc.).

An evolution Hamiltonian is proportional to the sum of a first term proportional to the problem Hamiltonian and a second term proportional to the disordering Hamiltonian. As previously discussed, a typical evolution may be represented by equation 1:

$$H_E \propto A(t)H_D + B(t)H_P \quad (1)$$

where $H_P$ is the problem Hamiltonian, disordering Hamiltonian is $H_D$, $H_E$ is the evolution or instantaneous Hamiltonian, and A(t) and B(t) are an example of evolution coefficients which control the rate of evolution. In general, evolution coefficients vary from 0 to 1. In some embodiments, a time varying evolution coefficient is placed on the problem Hamiltonian. A common disordering Hamiltonian is shown in equation 2:

$$H_D \propto -\frac{1}{2}\sum_{i=1}^{N} \Delta_i \sigma_i^x \quad (2)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. A common problem Hamiltonian includes first component proportional to diagonal single qubit terms and a second component proportional to diagonal multi-qubit terms. The problem Hamiltonian, for example, may be of the form:

$$H_P \propto -\frac{\varepsilon}{2}\left[\sum_{i=1}^{N} h_i \sigma_i^z + \sum_{j>i}^{N} J_{ij}\sigma_i^z \sigma_j^z\right] \quad (3)$$

where N represents the number of qubits, $\sigma_i^z$ is the Pauli z-matrix for the $i^{th}$ qubit, $h_i$ and $J_{i,j}$ are dimensionless local fields coupled into each qubit, and $\varepsilon$ is some characteristic energy scale for $H_P$. Here, the $\sigma_i^z$ and $\sigma_i^z\sigma_j^z$ terms are examples of "diagonal" terms. The former is a single qubit term and the latter a two qubit term. Throughout this specification, the terms "final Hamiltonian" and "problem Hamiltonian" are used interchangeably. Hamiltonians such as $H_D$ and $H_P$ in equations 2 and 3, respectively, may be physically realized in a variety of different ways. A particular example is realized by an implementation of superconducting qubits.

FIG. 1 is a schematic diagram of a portion of an exemplary superconducting quantum processor 100 designed for AQC (and/or quantum annealing) that may be used and/or adapted for use in accordance with the present systems and methods. The portion of superconducting quantum processor 100 shown in FIG. 1 includes two superconducting qubits 101, 102 and a tunable ZZ-coupler 111 coupling information therebetween (i.e., providing pair-wise coupling between qubits 101 and 102). While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize AQC and/or QA by initializing the system with the Hamiltonian described by equation 2 and evolving the system to the Hamiltonian described by equation 3 in accordance with the evolution described by equation 1. Quantum processor 100 includes a plurality of interfaces 121-125 that are used to configure and control the state of quantum processor 100. Each of interfaces 121-125 may be realized by a respective inductive coupling structure, as illustrated, as part of a programming subsystem. Such a programming subsystem may be separate from quantum processor 100, or it may be included locally (i.e., on-chip with quantum processor 100) as described in, for example, U.S. Pat. Nos. 7,876,248 and 8,035,540.

In the operation of quantum processor 100, interfaces 121 and 124 may each be used to couple a flux signal into a respective compound Josephson junction 131, 132 of qubits 101 and 102, thereby realizing the $\Delta_i$ terms in the system Hamiltonian. This coupling provides the off-diagonal $\sigma^x$ terms of the Hamiltonian described by equation 2 and these flux signals are examples of "tunneling energies" and/or "disordering signals." Similarly, interfaces 122 and 123 may each be used to couple a flux signal (i.e., an energy bias) into a respective qubit loop of qubits 101 and 102, thereby realizing the $h_i$ terms in the system Hamiltonian. This coupling provides the diagonal $\sigma^z$ terms of equation 3. Furthermore, interface 125 may be used to couple a flux signal into coupler 111, thereby realizing the $J_{ij}$ term(s) in the system Hamiltonian which control the coupling strength(s) of the coupler(s). This coupling provides the diagonal $\sigma_i^z\sigma_j^z$ terms of equation 3. In FIG. 1, the contribution of each of interfaces 121-125 to the system Hamiltonian is indicated in boxes 121a-125a, respectively. Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 121-125.

In the context of quantum processor 100, the term "programming subsystem" is used to generally describe the interfaces (e.g., "programming interfaces" 121-125) used to apply and/or evolve the programmable parameters (e.g., the $\Delta_i$, $h_i$ and $J_{ij}$ terms) to the programmable elements of quantum processor 100 and other associated control circuitry and/or instructions. As previously described, the programming interfaces of the programming subsystem may communicate with other subsystems which may be separate from the quantum processor or may be included locally on the processor.

Quantum processor 100 also includes readout devices 141 and 142, where readout device 141 is configured to read out the state of qubit 101 and readout device 142 is configured to read out the state of qubit 102. In the embodiment shown in FIG. 1, each of readout devices 141 and 142 comprises a respective DC-SQUID that is configured and positioned to inductively couple to the corresponding qubit (qubits 101 and 102, respectively). In the context of quantum processor 100, the term "readout subsystem" is used to generally describe the readout devices 141, 142 used to read out the final states of the qubits (e.g., qubits 101 and 102) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Application Publication 2012-064974.

While FIG. 1 illustrates only two physical qubits 101, 102, one coupler 111, and two readout devices 141, 142, a quantum processor (e.g., processor 100) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

At least some of the devices illustrated in FIG. 1 are simplified in order to enhance clarity. As an example, the structure of the qubits (101, 102) and the interface to the readout devices (141, 142) are simplified in FIG. 1 in order to reduce clutter. While the simplified circuits of quantum processor 100 may be sufficient for some applications, a quantum processor may employ qubit circuits and/or readout schemes that are considerably more complicated than those which are illustrated in FIG. 1.

The elements of a quantum processor (e.g., a superconducting quantum processor designed to perform adiabatic quantum computation and/or quantum annealing such as processor 100 from FIG. 1) may be used to perform and/or manipulate macroscopic resonant tunneling as described in, at least: M. H. S. Amin et al., "Macroscopic Resonant Tunneling in the Presence of Low Frequency Noise", *Phys. Rev. Lett.* 100, 197001 (2008); R. Harris et al., "Probing Noise in Flux Qubits via Macroscopic Resonant Tunneling", *Phys. Rev. Lett.* 101, 117003 (2008); T. Lanting et al., "Cotunneling in pairs of coupled flux qubits," *Phys. Rev. B* 82, 060512(R) (2010); and T. Lanting et al., "Probing high-frequency noise with macroscopic resonant tunneling," *Phys. Rev. B* 83, 180502 (2011), A. J. Berkley et al., "Tunneling spectroscopy using a probe qubit" *Phys. Rev. B* 87, 020502(R) (2013); hereafter "Berkley", each of which is incorporated herein by reference in its entirety. In accordance with the present systems and methods, the techniques for macroscopic resonant tunneling described in the above-listed publications may be employed in computational algorithms, such as for example in algorithms for operating a quantum processor to determine energy eigenvalues of a Hamiltonian. Furthermore, in some embodiments, the present systems and methods also describe new structures that may be added to a quantum processor to facilitate macroscopic resonant tunneling operations and/or to facilitate operating the quantum processor to determine energy eigenvalues of a Hamiltonian.

The computational algorithms described herein generally involve using a first qubit in a quantum processor to probe a characteristic or characteristics of at least one other qubit in the quantum processor. In this configuration, the first qubit that performs the probing is referred to as a "probe qubit" and the at least one other qubit is referred to as a "computation qubit." The computation qubit(s) may encode a problem Hamiltonian and the probe qubit may probe a characteristic or characteristics of the problem Hamiltonian by using, for example, a macroscopic resonant tunneling process to probe a characteristic or characteristics of the computation qubit(s). Thus, throughout this specification and the appended claims, the term "problem Hamiltonian" is used to refer to a Hamiltonian that is programmed into the qubits of a quantum processor (e.g., of the form shown in equation 3), the term "computation qubit" is used to refer to a qubit that is programmed to represent, map, or encode at least a portion of the problem Hamiltonian when the problem Hamiltonian is programmed into the qubits of the quantum processor, and the term "probe qubit" is used to refer to a qubit that is used to measure, scan, monitor, or otherwise probe at least one characteristic of the problem Hamiltonian by measuring, scanning, monitoring, or otherwise probing at least one characteristic of at least one of the computation qubits in the quantum processor. For example, in some embodiments, a probe qubit may be used to determine the entanglement in a plurality of computational qubits.

Figure 2A:
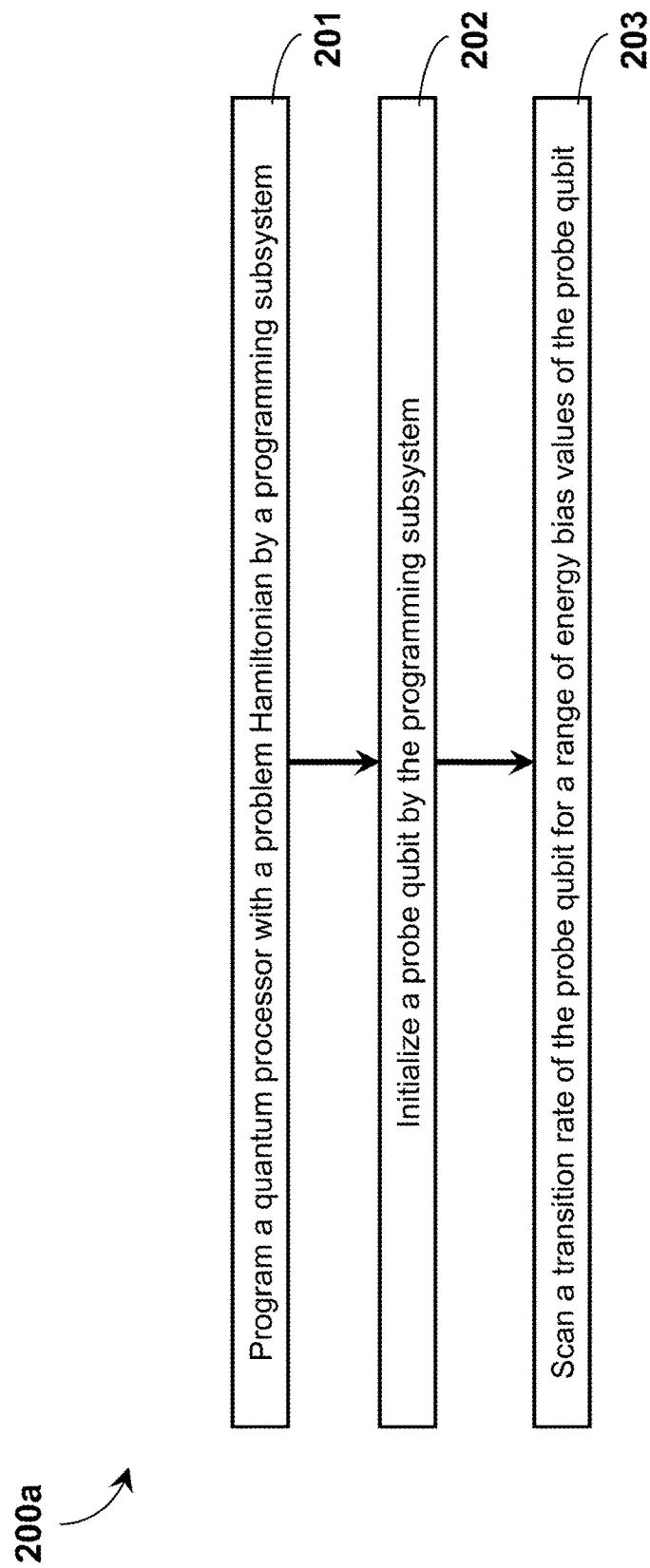
FIG. 2A is a flow-diagram showing a method of operating a quantum processor to determine at least one energy eigenvalue of a Hamiltonian in accordance with the present systems and methods.

FIG. 2A is a flow-diagram showing a method 200a of operating a quantum processor to determine at least one energy eigenvalue of a Hamiltonian in accordance with the present systems and methods. Method 200a includes three acts 201, 202, and 203, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments. Each of acts 201-203 may, in some embodiments, include multiple sub-acts as described in more detail in FIGS. 2B, 2C, and 2D.

At 201, the quantum processor is programmed with a problem Hamiltonian by a programming subsystem. The problem Hamiltonian may include at least one energy eigenvalue. The quantum processor may be similar to quantum processor 100 from FIG. 1 though may include any number of qubits. For example, the quantum processor may comprise a plurality of superconducting flux qubits (e.g., 101, 102) and the programming subsystem may include a plurality of programming interfaces (e.g., 121-125). Thus, programming the quantum processor with a problem Hamiltonian may include programming at least a subset of the superconducting flux qubits in the quantum processor as computation qubits.

At 202, a probe qubit is initialized by the programming subsystem. The probe qubit may be a superconducting flux qubit in the quantum processor that is not used as a computation qubit. For example, the probe qubit may be a superconducting flux qubit in the quantum processor that is not programmed to represent, map, or encode at least a portion of a problem Hamiltonian at 201. Initializing the probe qubit may involve communicatively coupling the probe qubit with at least one computation qubit in the quantum processor. The probe qubit may not need to be weakly coupled to at least one computation qubit in the quantum processor. For example, a probe qubit may be coupled with a computation qubit characterized by a coupling strength J, with a magnitude of a bias of approximately 2J applied to the computation qubit. In some embodiments, the value of the coupling strength J may be negative or an antiferromagnetic coupling.

At 203, a transition rate of the probe qubit is scanned for a range of energy bias values of the probe qubit in order to perform "tunneling spectroscopy" of the computation qubit(s). The "transition rate" of the probe qubit may refer to, for example, transitions between the energy states of the probe qubit by a macroscopic resonant tunneling process. For example, the potential energy of the probe qubit may be represented by a double-well potential and the energy state of the probe qubit may be an energy state within one of the two wells. Macroscopic resonant tunneling transitions refer to transitions in the energy state of the probe qubit from a first well to a second well in the double-well potential by quantum tunneling through the energy barrier that separates the two wells. The energy bias value may correspond to an amount of "tilt" controlling the relative depths of the two wells in the double-well potential. An energy state of the probe qubit may, for example, be deliberately programmed to correspond to a first well of the double-well potential that is of higher energy than a second well of the double-well potential so that a macroscopic resonant tunneling operation may be used to transition the energy state of the probe qubit from the first well to the second well. Thus, the "transition rate" may be at least partially dependent on a probability of the probe qubit transitioning from a first state to a second state via a macroscopic resonant tunneling process. The transition rate of the probe qubit may at least partially depend on a difference between an energy bias value of the probe qubit and an energy eigenvalue of the problem Hamiltonian such that at least one energy eigenvalue of the problem Hamiltonian at least approximately corresponds to an energy bias value of the probe qubit that produces a locally maximal transition rate of the probe qubit. In other words, scanning a transition rate of the probe qubit for a range of energy bias values of the probe qubit may involve measuring a transition rate of the probe qubit for multiple energy bias values of the probe qubit in order to determine an energy bias value of the probe qubit that produces a local maximum, peak, or spike in the transition rate of the probe qubit.

Figure 2B:
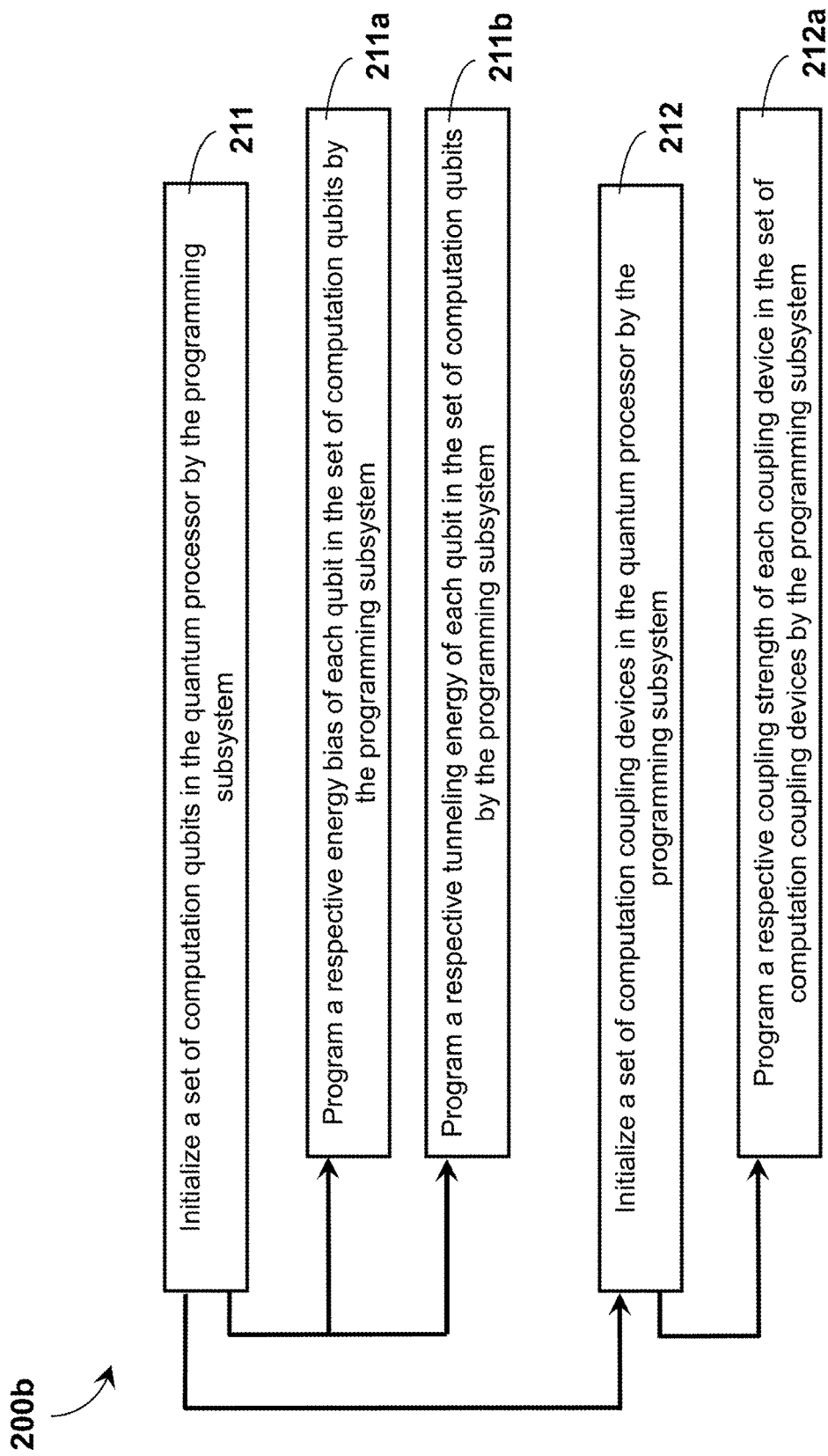
FIG. 2B is a flow-diagram showing a method of programming a quantum processor with a problem Hamiltonian by a programming subsystem, which may be executed in performing the method of operating a quantum processor of FIG. 2A in accordance with the present systems and methods.
Figure 2C:
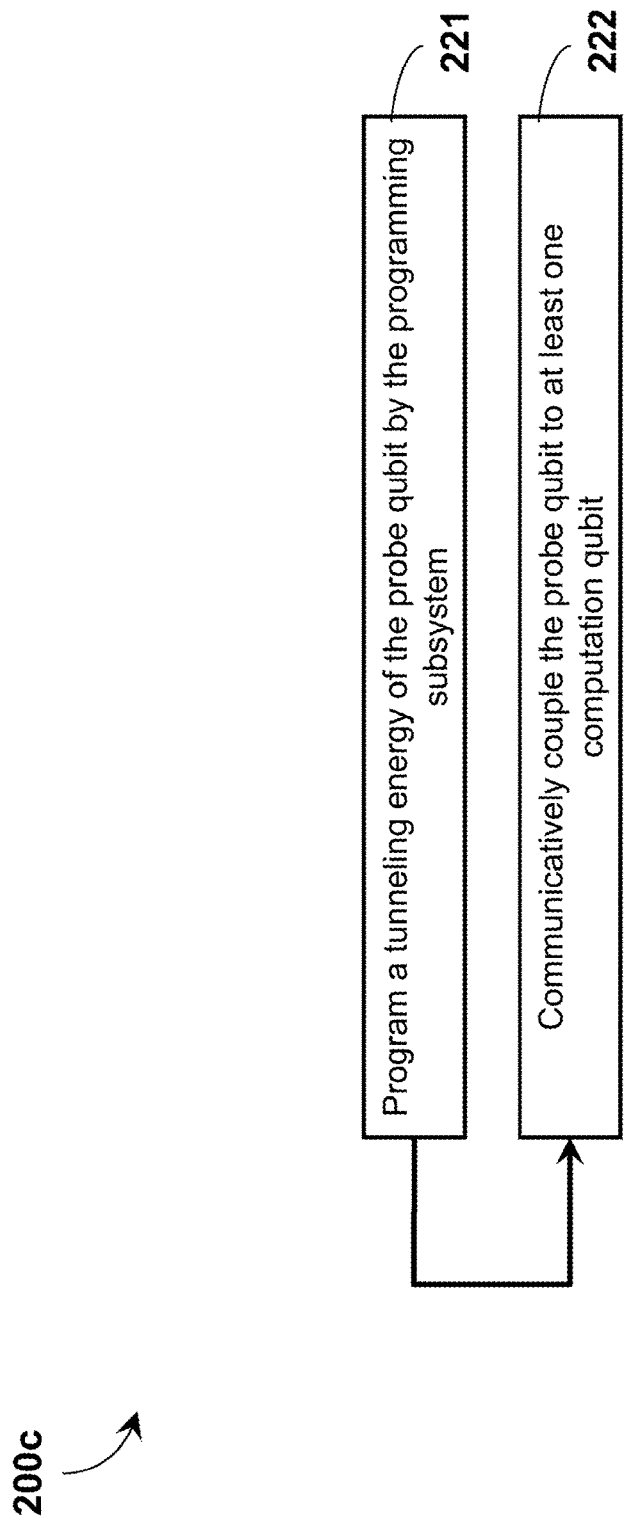
FIG. 2C is a flow-diagram showing a method of initializing a probe qubit by a programming subsystem, which may be executed in performing the method of operating a quantum processor of FIG. 2A in accordance with the present systems and methods.
Figure 2D:
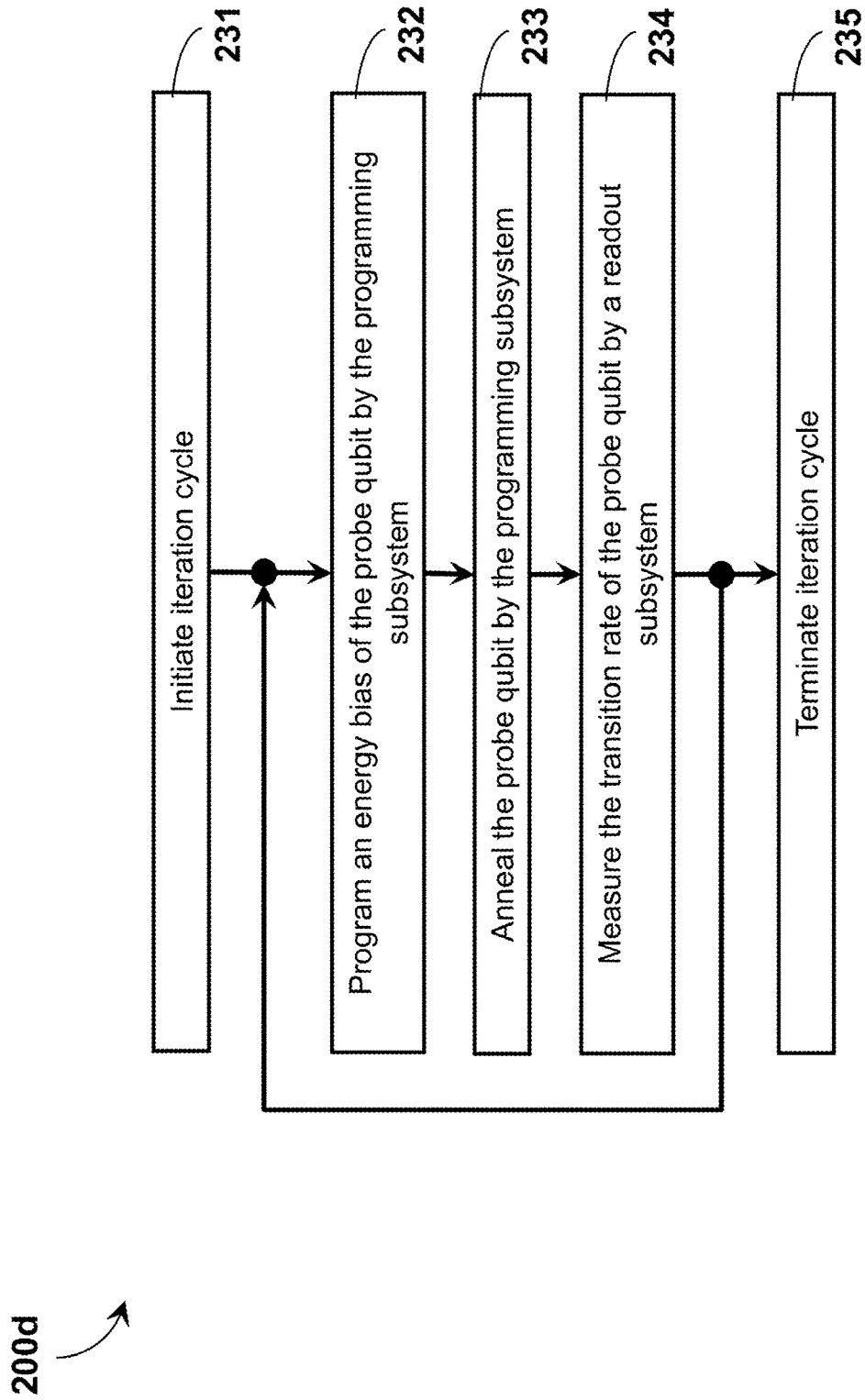
FIG. 2D is a flow-diagram showing a method of scanning a transition rate of a probe qubit for a range of energy bias values of the probe qubit, which may be executed in performing the method of operating a quantum processor of FIG. 2A in accordance with the present systems and methods.

As previously described, each of acts 201-203 from method 200a may, in some embodiments, include multiple acts or sub-acts. Exemplary acts/sub-acts are now described in FIGS. 2B, 2C, and 2D FIG. 2B is a flow-diagram showing a method 200b of programming a quantum processor with a problem Hamiltonian by a programming subsystem, which may be executed in performing act 201 from method 200a of FIG. 2A in accordance with the present systems and methods. Method 200b includes five acts or sub-acts 211, 211a, 211b, 212, and 212a, though those of skill in the art will appreciate that in alternative embodiments certain acts/sub-acts may be omitted and/or additional acts/sub-acts may be added. Those of skill in the art will appreciate that the illustrated order of the acts/sub-acts is shown for exemplary purposes only and may change in alternative embodiments.

At 211, a set of computation qubits in the quantum processor is initialized by the programming subsystem. Initializing the set of computation qubits may include programming a respective energy bias of each qubit in the set of computation qubits by the programming subsystem at 211a (e.g., programming the respective $h_i$ term of each computation qubit as descrobor for FIG. 1) and/or programming a respective tunneling energy of each qubit in the set of computation qubits by the programming subsystem at 211b (e.g., programming the respective $\Delta_i$ term of each computation qubit as described in FIG. 1). The set of computation qubits must include at least one computation qubit but may include any number of computation qubits that is greater than or equal to one (e.g., tens, hundreds, thousands, or millions of computation qubits, etc.).

The quantum processor may include a plurality of coupling devices that provide tunable communicative coupling between respective sets of the computation qubits. At 212, a set of computation coupling devices in the quantum processor is initialized by the programming subsystem. Throughout this specification and the appended claims, the term "computation coupling device" is used to refer to a coupling device that is programmed to represent, map, or encode at least a portion of a problem Hamiltonian when a quantum processor is programmed with a problem Hamiltonian. Initializing the set of computation coupling devices may include programming a respective coupling strength of each coupling device in the set of computation coupling devices by the programming subsystem at 212a (e.g., programming the respective $J_{ij}$ term of each computation coupling device as described in FIG. 1). The set of computation coupling devices must include at least one computation coupling device but may include any number of computation coupling devices that is greater than or equal to one.

FIG. 2C is a flow-diagram showing a method 200c of initializing a probe qubit by a programming subsystem, which may be executed in performing act 202 from method 200a of FIG. 2A in accordance with the present systems and methods. Method 200c includes two acts 221 and 222, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments.

At 221, a tunneling energy of the probe qubit is programmed by the programming subsystem. Programming a tunneling energy of the probe qubit may include applying a flux bias to the probe qubit (i.e., to a compound Josephson junction of the probe qubit) via a programming interface to realize a first $\Delta_i$ term in the probe qubit. The tunneling energy of the probe qubit may be significantly less than the respective tunneling energies of the computation qubits, which may enable the computation qubits to be operated in a higher frequency regime than the probe qubit. This configuration is advantageous in quantum processor architectures that have limited signal bandwidth, since the probe qubit may be operated within the range of the limited signal bandwidth while the computation qubits may be operated outside of this limited range (i.e., at higher frequency ranges). Therefore, it may allow for ease of building greater scaling of the quantum processor without the need to scale the number of control lines.

At 222, the probe qubit is communicatively coupled to at least one computation qubit. The probe qubit may be directly communicatively coupled to at least one computation qubit (e.g., via direct inductive or galvanic coupling), or the probe qubit may be indirectly communicatively coupled to at least one computation qubit (e.g., via a coupling device).

FIG. 2D is a flow-diagram showing a method 200*d* of scanning a transition rate of the probe qubit for a range of energy bias values of the probe qubit, which may be executed in performing act 203 from method 200*a* of FIG. 2A in accordance with the present systems and methods. Method 200*d* includes five acts 231, 232, 233, 234 and 235, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments.

At 231, an iteration cycle is initiated. Since act 203 from method 200*a* involves scanning a transition rate of the probe qubit for a range of energy bias values of the probe qubit, the scanning may be done iteratively using a different energy bias of the probe qubit in each iteration. The iteration cycle may include acts 232, 233, and 234.

At 232, the energy bias of the probe qubit is programmed by the programming subsystem. Programming an energy bias of the probe qubit may include applying a flux bias to the probe qubit via a programming interface to realize a diagonal single qubit term (e.g. $h_i$ term) in the probe qubit. The energy bias may correspond to a "tilt" (i.e., a difference in the relative depths of the two wells) in the double-well potential of the probe qubit.

At 233, the probe qubit is annealed by the programming subsystem. Annealing the probe qubit may include varying the tunneling energy of the probe qubit via a programming interface to increase the height of the energy barrier that separates the two wells in the double-well potential of the probe qubit, thereby causing a state of the probe qubit to localize in one of the two wells.

At 234, the transition rate of the probe qubit is measured by a readout subsystem. The transition rate of the probe qubit may refer to transitions between the energy states of the probe qubit that result from resonant tunneling through the energy barrier that separates the two wells in the double-well potential of the probe qubit, where the transition rate of the probe qubit is locally maximal (i.e., exhibits a local maximum, peak, or spike) when an energy bias value of the probe qubit causes an energy state of the probe qubit to resonate with (e.g., substantially equate or align with) an energy eigenvalue of the problem Hamiltonian embodied by the computation qubit(s) to which the probe qubit is communicatively coupled.

At 235, the iteration cycle is terminated. Thus, acts 232, 233, and 234 are iterated for multiple different energy bias values of the probe qubit and the iteration cycle is terminated at 235 when, for example: a desired number or range of energy bias values has been used, at least one energy eigenvalue of the problem Hamiltonian has been identified, and/or a maximum desired amount of computation time has elapsed.

Certain acts of method 200*a* of FIG. 2A (and consequently certain acts/sub-acts of method 200*b* of FIG. 2B, method 200*c* of FIG. 2C, and/or method 200*d* of FIG. 2D) make reference to a probe qubit. In accordance with the present systems and methods, any or all of the acts and/or sub-acts of FIGS. 2A, 2B, 2C, and/or 2D may be completed by multiple probe qubits within a single quantum processor. For example, methods 200*a*, 200*b*, 200*c*, and 200*d* (including all associated acts and sub-acts thereof) may be carried out using only one probe qubit, or multiple times either in series or in parallel using multiple probe qubits. Thus, in some embodiments, methods 200*a*, 200*b*, 200*c*, and 200*d* (including all associated acts and sub-acts thereof) may be completed using a first probe qubit and at least one additional probe qubit, such as a second probe qubit.

The present systems and methods describe new modes of use for quantum processor hardware. For example, quantum processor 100 from FIG. 1 is used in the art to find a low-energy configuration (such as the ground state energy configuration) of a problem Hamiltonian, where the problem Hamiltonian specifies a set of constraints. The energy configuration is returned as a bit-string representing a configuration of qubit states that satisfactorily complies with the constraints imposed by the problem Hamiltonian. The modes of use described herein involve determining energy eigenvalues of a Hamiltonian without the need to measure the configuration of the qubit states. Such contrasts from returning a bit-string as a solution, where the bit-string represents a configuration of qubit states that corresponds to a low-energy configuration under the conditions specified by the problem Hamiltonian. The energy eigenvalues of a Hamiltonian (e.g., a problem Hamiltonian that is embodied by a system of any number of computation qubits) are discrete-valued characteristics of the Hamiltonian that, in the present systems and methods, are probed via at least one probe qubit. Thus, the modes of use described herein involve returning discrete values as solutions, where the discrete values correspond to characteristics of a system of interacting computation qubits that embody a problem Hamiltonian. In contrast to determining a configuration that produces a low-energy state of a problem Hamiltonian, the modes of use described herein involve determining the value of at least one low-energy state of the problem Hamiltonian (e.g., the value of the ground state energy of the problem Hamiltonian) and/or the values of multiple low-energy states of the problem Hamiltonian.

A person of skill in the art will appreciate that determining energy eigenvalues of a Hamiltonian (e.g., energy eigenvalues of a problem Hamiltonian) may be of significant utility and/or value in many different scenarios. As an example, the problem Hamiltonian may represent the Hamiltonian of a molecular system (e.g., the Hamiltonian of a specific molecule, such as a drug molecule) and determining the energy eigenvalues of the molecular system may provide critical insight into the behavior, composition, or function of the molecular system. In accordance with the present systems and methods, the Hamiltonian of a molecular system may be mapped onto a set of computation qubits in a superconducting quantum processor such as processor 100 from FIG. 1 by using Jordan-Wigner transformations to map fermionic operators of the molecular system to spin operators of the quantum processor. Techniques for employing Jordan-Wigner transformations would be understood by a person of skill in the art and are described in, for example, Michael A. Nielsen, "The Fermionic canonical commutation relations and the Jordan-Wigner transform," dated Jul. 29, 2005, available online, accessed May 30, 2013.

In methods 200*a*, 200*b*, 200*c*, and 200*d*, a set of computation qubits may be programed to represent a problem Hamiltonian and at least one probe qubit may be communicatively coupled to at least one of the computation qubits. In this configuration, the at least one probe qubit may not be programmed to represent a portion of the problem Hamiltonian; however, communicative coupling between the probe qubit and a computation qubit may perturb the programming signals (e.g., energy biases) that are applied to the computation qubit. Such perturbation may also perturb the problem Hamiltonian. In accordance with the present systems and methods, such perturbations may be compensated by applying a compensation signal to at least the computation qubit that is communicatively coupled to the probe qubit. For example, method 200a may include the additional act or sub-act of programming the at least one computation qubit to which the probe qubit is communicatively coupled with a compensation signal by the programming subsystem to compensate for the communicative coupling between the probe qubit and the at least one computation qubit. Communicative coupling between the probe qubit and the at least one computation qubit may be characterized by a coupling strength J. In some embodiments, programming the at least one computation qubit to which the probe qubit is communicatively coupled includes adding a compensation signal by the programming subsystem providing a local bias of a magnitude of at least approximately 2J. In some embodiments, the added compensation signal provides a local bias of approximately 2J. In some embodiments, the added compensation signal may be of opposite sign to the coupling strength. As described in more detail in Berkley, this compensation scheme can improve the resolution of the energy eigenvalues of the problem Hamiltonian and facilitate resonant tunneling operations between the probe qubit and the computation qubit(s).

In some embodiments, the probe qubit may have a large energy barrier and a corresponding low probability of quantum tunneling. In some embodiments, the probe qubit may be similar to a computation qubit, where the computation qubit may have a lower energy barrier with a higher probability of quantum tunneling. The coupling of the probe qubit to the at least one computation qubit supports a method to determine the spectrum of the at least one computation qubit. By adjusting the probe qubit bias and looking for changes in escape rate from the energetic isolated state to another leads to information on the state of the probe qubit coupled to the at least one computation qubit. This process is conceptually similar to macroscopic resonant tunneling. Local peaks in the escape rate imply an alignment of energy levels on either side of a barrier to effect macroscopic resonant tunneling through a barrier. The alignment occurs by changing the bias on the system. The differences in the locations in units of bias of the local peaks of the escape rate can be converted to differences in the energy levels of the Hamiltonian.

As previously described, the present systems and methods provide new modes of use for quantum processors. In addition, in some embodiments, the present systems and methods provide new structures that may be added to quantum processors in order to, for example, facilitate and/or improve the performance of macroscopic resonant tunneling operations and/or the performance of the new modes of use described herein. In accordance with the present systems and methods, a quantum processor may include at least one dedicated probe qubit that is structurally designed to perform the functions of a probe qubit as described herein and structurally distinct from a computation qubit.

Tunneling spectroscopy of a large system of communicatively coupled computation qubits may be used for qubit entanglement studies and to demonstrate quantum simulation. However, as the at least one probe qubit communicatively coupled to the system of communicatively coupled computation qubits is annealed, the spectroscopic energy resolution (i.e., spectral resolution) may be limited by incoherent broadening in the probe qubit. In other words, when each eigenstate of the probe qubit is fit to a Gaussian distribution with the peaks of the distribution corresponding to the energy bias values of the probe qubit communicatively coupled to the computation qubit system that produce locally maximal transition rates of the probe qubit, the width of each peak of the Gaussian distribution (for example, full width half maximum) may be too broad making it difficult to distinguish between the specific eigenstates of the probe qubit. This may reduce/hinder spectroscopic capabilities of the probe qubit. The energy broadening, for qubit tunneling spectroscopy with a probe device may be given as a relationship proportional to the product of the width of the broadening observed and the persistent current of the probe qubit. An example of this:

$$R = 2W_{phi} I_p \quad (4)$$

where $W_{phi}$ is the width (in observed units such as flux unit) of the broadening and $I_p$ is the persistent current of the probe qubit. The objective is to reduce R such that narrower peaks within the Gaussian distribution may be obtained. R may be reduced by reducing $W_{phi}$ and/or $I_p$. For example, increasing the Josephson inductance of the probe qubit may reduce noise and therefore reduce $W_{phi}$. Reducing the critical current $I_c$ of the probe qubit by a similar factor may reduce $I_p$. Reducing these factors, (e.g., persistent current of the probe qubit, width of the broadening in flux units by increasing the Josephson inductance of the probe qubit, width of the broadening in energy units) leads to narrower peaks and improved spectral resolution.

Figure 3:
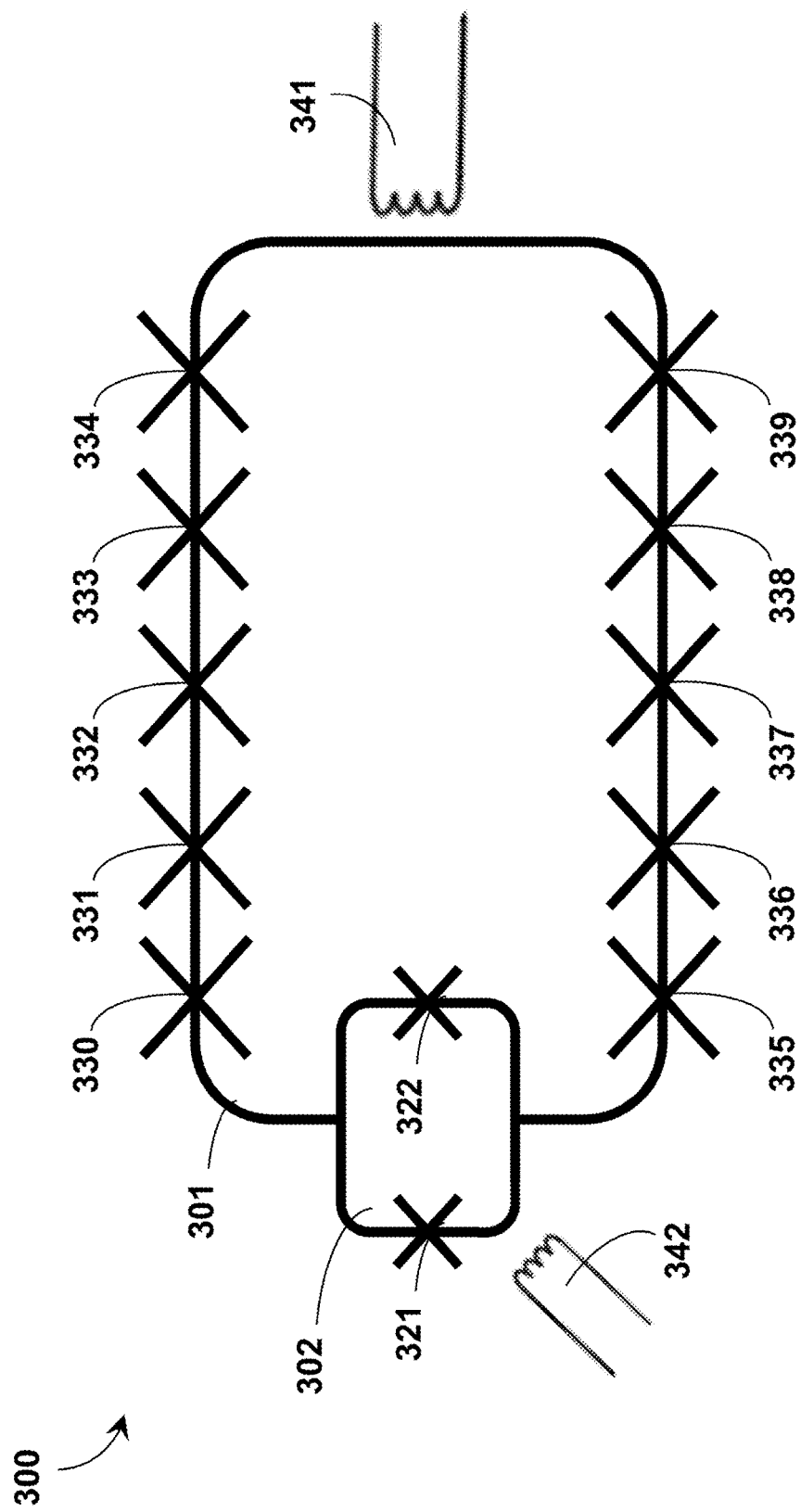
FIG. 3 is a schematic diagram of a dedicated probe qubit in accordance with the present systems and methods.

FIG. 3 is a schematic diagram of a dedicated probe qubit 300 in accordance with the present systems and methods. Probe qubit 300 is similar to superconducting flux quits 101 and 102 from FIG. 1 in that it comprises a loop of superconducting material 301 interrupted by a compound Josephson junction 302. Compound Josephson junction 302 includes at least two Josephson junctions 321, 322 that are superconductingly electrically coupled in parallel with one another with respect to loop of superconducting material 301. However, probe qubit 300 further comprises additional Josephson junctions (e.g., ten shown) 330-339 that interrupt loop of superconducting material 301 and are superconductingly electrically coupled in series with one another and superconductingly electrically coupled in series with compound Josephson junction 302 with respect to loop of superconducting material 301. In accordance with the present systems and methods, these additional Josephson junctions 330-339 are included in probe qubit 300 in order to positively contribute to the Josephson inductance $L_{Jp}$ of probe qubit 300.

A superconducting flux qubit, such as either of qubits 101 and 102 from FIG. 1, typically exhibits a total inductance $L_T$ that is at least partially given by the sum of a geometric inductance $L_G$ and a Josephson inductance $L_J$ (i.e., $L_T \approx L_G + L_J$). The geometric inductance $L_G$ is a characteristic that arises due, at least in part, to the inductance of the wiring that forms the qubit. For example, the geometric inductance $L_G$ of qubit 101 from FIG. 1 results, at least in part, from the inductance of the wiring that forms the loop of superconducting material and the compound Josephson junction 131. The magnitude of the geometric inductance $L_G$ depends on, among other things, the length, width, and geometry of the wiring of the qubit. On the other hand, the Josephson inductance $L_J$ is a characteristic that arises, at least in part, due to the inductance of the Josephson junction(s) that interrupt the wiring of the qubit. For example, the Josephson inductance $L_J$ of qubit 101 from FIG. 1 results, at least in part, from the inductance of the Josephson junctions in compound Josephson junction 131. The magnitude of the Josephson inductance $L_J$ depends on, among other things, the size and number of Josephson junctions in the qubit.

In quantum processors that employ communicatively coupleable superconducting flux qubits (e.g., processor 100 from FIG. 1), the wiring of each superconducting flux qubit is typically quite long because the qubit body must provide sufficient space and inductance to permit communicative couplings to multiple other qubits. As a result, superconducting flux qubits that are designed to be operated as computation qubits (i.e., superconducting flux qubits that are communicatively coupleable to multiple other superconducting flux qubits and are to be used to encode at least a portion of a problem Hamiltonian) typically have a large geometric inductance $L_G$ compared to their Josephson inductance $L_J$. In other words, for a computation qubit (denoted by subscript "c" in the symbols that follow), $L_{Gc} > L_{Jc}$, sometimes by several orders of magnitude.

In accordance with the present systems and methods, the performance of a probe qubit may be advantageously enhanced if: a) the persistent current $I_p$ is reduced, b) the geometric inductance $L_G$ is reduced, and c) this reduction in the geometric inductance is at least partially offset and/or compensated for by an increase in the Josephson inductance $L_J$. In other words, for a probe qubit (denoted by subscript "p" in the symbols that follow), it can be advantageous if $L_{Jp} > L_{Gp}$, sometimes by several orders of magnitude. Probe qubit 300 from FIG. 3 provides an exemplary design for how the geometric inductance $L_{Gp}$ can be reduced and how the Josephson inductance $L_{Jp}$ can be made to exceed the geometric inductance $L_{Gp}$. Namely, probe qubit 300 comprises a loop of superconducting material 301 that is comparatively shorter than the loop of superconducting material of a typical computation qubit (e.g., shorter than the loop of superconducting material in either of superconducting flux qubits 101 and/or 102 from FIG. 1) in order to reduce the geometric inductance $L_{Gp}$ of probe qubit 300 and probe qubit 300 includes several Josephson junctions (i.e., ten Josephson junctions 330-339) superconducting electrically coupled in series with one another in loop of superconducting material 301 in order to positively contribute to (i.e., enhance) the Josephson inductance $L_{Jp}$ of probe qubit 300. Those of skill in the art will appreciate that the number of Josephson junctions shown in probe qubit 300 (i.e., ten Josephson junctions 330-339) is used for exemplary purposes only and, in practice, a dedicated probe qubit may employ any number of Josephson junctions that provide sufficient $L_{Jp} > L_{Gp}$. Furthermore, the persistent current of a probe qubit may be reduced (i.e., lower than the persistent current of a computation qubit) by reducing the critical current of the probe qubit. In FIG. 3, programming interface 342 may be used to adjust the critical current of probe qubit 300. For example, the critical current of a probe qubit may be reduced to approximately half the critical current of a computation qubit such that the persistent current of the probe qubit may be approximately half of that of the computation qubit at a given tunneling energy.

At least one advantage of a probe qubit design that embodies $L_{Jp} > L_{Gp}$ and a lower $I_p$ than that of a computation qubit is that such a device may provide significantly better spectral resolution (e.g., produce significantly narrower peaks during magnetic resonant tunneling) than a typical computation qubit for which $L_{Gp} > L_{Jp}$ and a corresponding higher $I_p$. During the fabrication of any superconducting qubit, defects may develop in the wiring and/or dielectric layers and these defects may act as sources of noise that adversely affect the performance of the qubit. In the design of a dedicated probe qubit (e.g., probe qubit 300 from FIG. 3), the wiring length is truncated (i.e., $L_{Gp}$ is reduced) in order to reduce coupling between the defects and the qubit itself and thereby reduce the effect these defects have on the performance of the qubit. For example, if a computation qubit has a loop of superconducting material of length $X_1$, then the probe qubit advantageously has a loop of superconducting material of length $<X_1$. However, this reduction in the geometric inductance $L_{Gp}$ has a reductive effect on the total inductance of the probe qubit $L_{Tp}$. In order to compensate for this reductive effect and provide a total inductance $L_{Tp}$ in the correct parametric range for macroscopic resonant tunneling operations, a number of additional Josephson junctions are added to the qubit body (e.g., Josephson junctions 330-339 from FIG. 3) to augment the Josephson inductance $L_{Jp}$ of the probe qubit. Thus, the design of probe qubit 300 (namely, realizing $L_{Jp} > L_{Gp}$) provides significantly reduced coupling to defect noise (via reduced wiring length and $L_{Gp}$) while using augmented Josephson inductance $L_{Jp}$ to maintain a total inductance $L_{Tp}$ that is sufficient for macroscopic resonant tunneling operations. Furthermore, as previously described, realizing $L_{Jp} > L_{Gp}$ may reduce $W_{phi}$. The resulting improved spectral resolution of probe qubit 300 can facilitate many aspects of quantum processor operation, including: the new mode of use described herein (i.e., determining eigenvalues of a Hamiltonian), device calibration procedures, scientific experiments involving magnetic resonant tunneling, etc.

In some implementations, it may be advantageous for the total inductance of a probe qubit $L_{Tp}$ to be substantially equal to the total inductance of each computation qubit $L_{Tc}$ in a quantum processor architecture. In such cases, the Josephson inductance $L_{Jp}$ of the probe qubit may be designed (i.e., by employing an appropriate number N of additional Josephson junctions) to compensate for and/or offset the decrease in the geometric inductance $L_{Gp}$ that results from the reduced wiring length such that the total inductance $L_{Tp}$ remains substantially unchanged.

Furthermore, probe qubits may not need to be strictly coherent. A coherent qubit may have a long dephasing time. The longest reproducible dephasing times reported, vary from about 1 ns to about 10 µs. Dephasing of a qubit may occur from noise as well as coupling to the environment. Eliminating noise and removing coupling to the environment are central challenges in qubit engineering. Therefore, another advantage of using a probe qubit is the relaxed need for the probe qubit to be coherent.

As illustrated in FIG. 3, Josephson junctions 330-339 are larger than Josephson junctions 321 and 322 that make up compound Josephson junction 302. In probe qubit 300, Josephson junctions 330-339 are large in order to provide substantial Josephson inductance. A person of skill in the art will appreciate, in light of this disclosure, that the sizes of the Josephson junctions in a probe qubit may vary in different implementations.

Probe qubit 300 is programmed and/or controlled via a programming subsystem comprising programming interfaces 341 and 342. Programming interface 341 couples flux signals to loop of superconducting material 301 in order to control the energy bias (i.e., energy bias values, or "tilt") of probe qubit 300 and programming interfaces 342 couples flux signals to compound Josephson junction 302 in order to control the tunneling energy (i.e., the barrier height) of probe qubit 300. The programming subsystem used to program a probe qubit may comprise components of a programming subsystem used to program computation qubits and/or other elements of a quantum processor.

Figure 4:
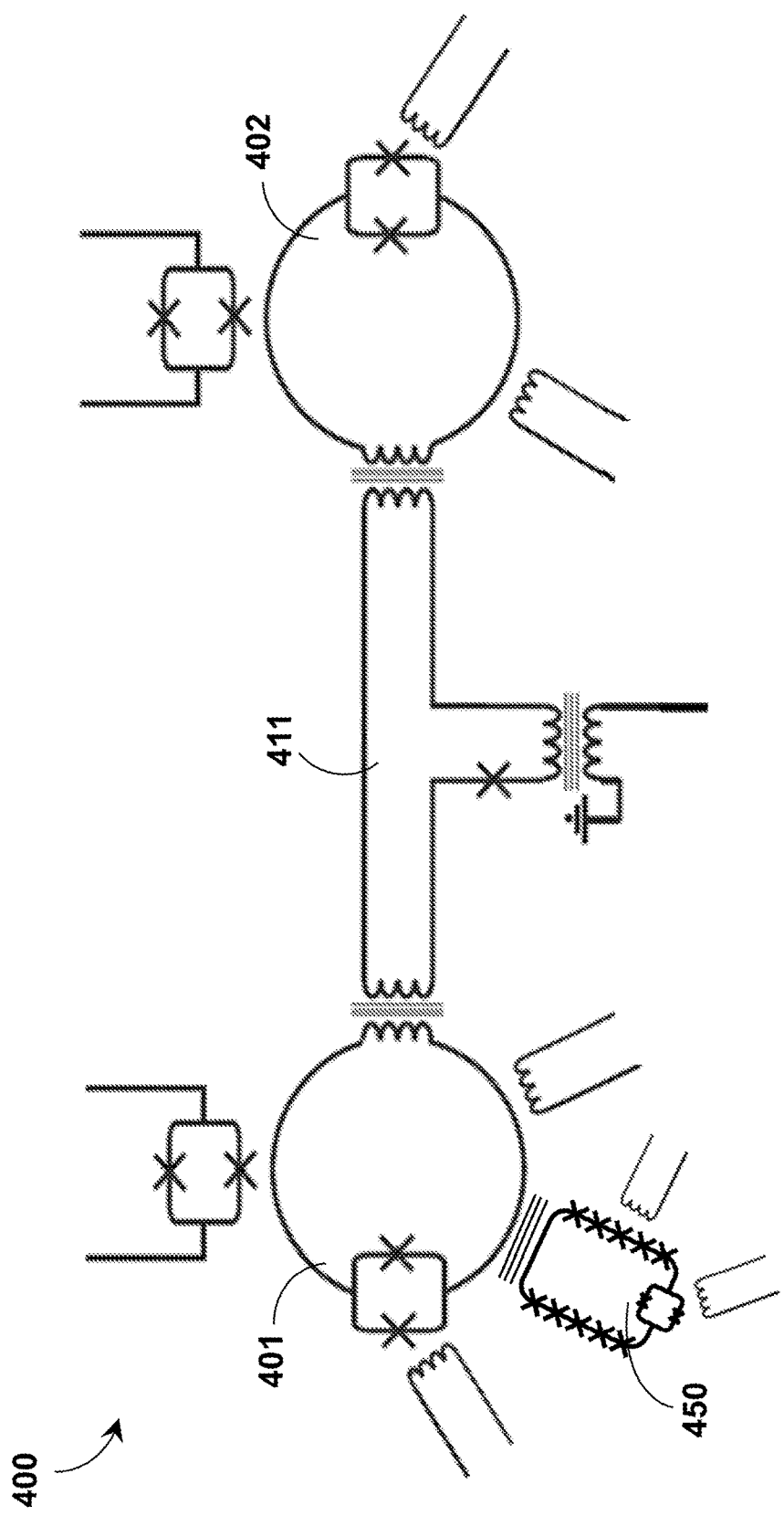
FIG. 4 is a schematic diagram of a quantum processor that includes a dedicated probe qubit in accordance with the present systems and methods.

FIG. 4 is a schematic diagram of a quantum processor 400 that includes a dedicated probe qubit 450 in accordance with the present systems and methods. Processor 400 comprises two superconducting flux qubits 401, 402 with a tunable ZZ-coupler 411 providing tunable communicative coupling therebetween. Probe quit 450 comprises a loop of superconducting material interrupted by a compound Josephson junction and several (i.e., ten) serially-connected Josephson junctions. In processor 400, qubits 401 and 402 are operated as computation qubits and probe qubit 450 is directly communicatively coupleable to qubit 401 via direct inductive coupling. In alternative implementations, probe qubit 450 may be directly communicatively coupled to a computation qubit (e.g., to qubit 401) via direct galvanic coupling, or probe qubit 450 may be indirectly communicatively coupleable to a computation qubit (e.g., to qubit 401) by a coupling device (such as coupler 411).

In accordance with the present systems and methods, probe qubit 450 employs significantly less wiring than computation qubits 401 and 402. For example, computation qubits 401 and 402 each include a respective loop of superconducting material of length $\sim X_1$, whereas probe qubit 450 includes a loop of superconducting material having length $<X_1$. As a result, probe qubit 450 has a significantly lower geometric inductance than computation qubits 401 and 402 (i.e., $L_{Gp}<L_{Gc}$) and is subjected to less noise from defects present in the qubit wiring and/or dielectric layers of processor 400. Probe qubit 450 also includes more Josephson junctions than computation qubits 401 and 402 (e.g., ten more Josephson junctions) which maintain the total inductance of probe qubit 450 ($L_{Tp}\sim L_{Gp}+L_{Jp}$) at a range suitable for macroscopic resonant tunneling operations by augmenting the Josephson inductance of probe qubit 450 relative to that of computation qubits 401 and 402 (i.e., $L_{Jp}>L_{Jc}$). In some implementations, it is advantageous to include a number N of Josephson junctions in probe qubit 450 that provides a Josephson inductance $L_{Jp}$ that at least approximately compensates for and/or offsets the reduction in the geometric inductance $L_{Gp}$ of probe qubit 450 resulting from the reduction in the length of wiring of probe qubit 450 relative to computation qubits 401 ad 402, such that the total inductance $L_{Tp}$ of probe qubit 450 at least approximately equals the respective total inductance $L_{Tc}$ of each of computation qubits 401 and 402 (i.e., $L_{Tp}\sim L_{Tc}$). Depending on the specific configuration being implemented, N may be equal to 1, or N may be greater than or equal to 2. Furthermore, probe qubit 450 has a lower persistent current than the persistent current of computation qubit 401. For example, the persistent current of probe qubit 450 is approximately half of that of computation qubit 401. As previously described, the reduced $I_p$ of probe qubit 450 and/or increased $L_{Jp}$ may help reduce R of Equation 4 resulting in improved spectral resolution of probe qubit 450 communicatively coupled to computation qubit 401.

Processor 400 comprises two computation qubits 401, 402 and one probe qubit 450, where the one probe qubit 450 is communicatively coupleable to one of the computation qubits (i.e., to qubit 401). Processor 400 represents a scaled-down, simplified example of a processor that has been adapted to facilitate the new modes of use described herein. In practice, a processor may implement any number of computation qubits and any number of probe qubits; a single probe qubit may be communicatively coupleable to more than one computation qubit; and/or a single computation qubit may be communicatively coupleable to more than one probe qubit. For example, in an alternative implementation, processor 400 may include at least one additional probe qubit (i.e., at least a second probe qubit, not shown) that is communicatively coupleable to at least one of computation qubits 401 and/or 402, and/or processor 400 may include many more computation qubits (i.e., on the order of tens, hundreds, thousands, or millions of computation qubits).

Throughout this specification and the appended claims, the term "programming subsystem" is used to generally describe the programming elements (e.g., programming interfaces 121-125 of FIG. 1) included in a quantum processor (e.g., portion of quantum processor 100 of FIG. 1) and other associated control circuitry or instructions. As previously described, the programming subsystem may be separate from the quantum processor or included locally on the processor.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, International (PCT) patent applications referred to in this specification and/or listed in the Application Data Sheet including U.S. provisonal patent application Ser. No. 61/832,645 filed Jun. 7, 2013, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    programming a quantum processor including a plurality of superconducting flux qubits with a problem Hamiltonian, wherein the problem Hamiltonian has at least one energy eigenvalue;
    initializing a probe qubit from the plurality of superconducting flux qubits; and
    scanning a transition rate of the probe qubit for a range of energy bias values of the probe qubit, wherein the transition rate of the probe qubit at least partially depends on a difference between an energy bias value of the probe qubit and an energy eigenvalue of the problem Hamiltonian such that the at least one energy eigenvalue of the problem Hamiltonian approximately corresponds to an energy bias value of the probe qubit to produce a locally maximal transition rate of the probe qubit, wherein programming the quantum processor comprises:
    initializing a set of computation qubits from the plurality of superconducting flux qubits in the quantum processor with a respective energy bias for each qubit in the set of computation qubits and a respective tunneling energy for each qubit in the set of computation qubits; and initializing communicative couplings between the computation qubits in the quantum processor with a respective coupling strength for each coupling device in the set of coupling devices.

2. The method of claim 1 wherein initializing a probe qubit from the plurality of superconducting flux qubits comprises:
programming a tunneling energy of the probe qubit, wherein the tunneling energy of the probe qubit is less than the respective tunneling energies of the computation qubits; and
communicatively coupling the probe qubit to at least one computation qubit.

3. The method of claim 2 wherein the probe qubit is a superconducting flux qubit from the plurality of superconducting flux qubits that is not included in the set of computation qubits.

4. The method of claim 2, further comprising:
programming the at least one computation qubit to which the probe qubit is communicatively coupled with a compensation signal to compensate for the communicative coupling between the probe qubit and the at least one computation qubit.

5. The method of claim 4 wherein communicative coupling between the probe qubit and the at least one computation qubit is characterized by a coupling strength J, the method further comprising:
adding a compensation signal to the at least one computation qubit to which the probe qubit is communicatively coupled, wherein the compensation signal has a magnitude of at least approximately 2J and is of opposite sign to the coupling strength.

6. The method of claim 1 wherein scanning a transition rate of the probe qubit for a range of energy bias values of the probe qubit comprises, for a plurality of energy bias values for the probe qubit ranging from a first value to a second value, iteratively:
programming an energy bias of the probe qubit;
annealing the probe qubit; and
measuring the transition rate of the probe qubit.

7. The method of claim 6 wherein annealing the probe qubit includes lowering the tunneling energy of the probe qubit.

8. A method comprising:
programming a quantum processor including a plurality of superconducting flux qubits with a problem Hamiltonian, wherein the problem Hamiltonian has at least one energy eigenvalue;
initializing a probe qubit from the plurality of superconducting flux qubits; and
scanning a transition rate of the probe qubit for a range of energy bias values of the probe qubit, wherein the transition rate of the probe qubit at least partially depends on a difference between an energy bias value of the probe qubit and an energy eigenvalue of the problem Hamiltonian such that the at least one energy eigenvalue of the problem Hamiltonian approximately corresponds to an energy bias value of the probe qubit to produce a locally maximal transition rate of the probe qubit, wherein scanning a transition rate of the probe qubit for a range of energy bias values of the probe qubit comprises, for a plurality of energy bias values for the probe qubit ranging from a first value to a second value, iteratively:
programming an energy bias of the probe qubit;
annealing the probe qubit; and
measuring the transition rate of the probe qubit, wherein annealing the probe qubit includes lowering the tunneling energy of the probe qubit.

* * * * *